(12) United States Patent
Houmani

(10) Patent No.: US 10,518,616 B2
(45) Date of Patent: Dec. 31, 2019

(54) SLIDING AND PIVOTING DOOR COMBINATION ASSEMBLY FOR A VEHICLE

(71) Applicant: Riad M. Houmani, Toledo, OH (US)

(72) Inventor: Riad M. Houmani, Toledo, OH (US)

( * ) Notice: Subject to any disclaimer, the term of this patent is extended or adjusted under 35 U.S.C. 154(b) by 0 days.

(21) Appl. No.: 15/664,690

(22) Filed: Jul. 31, 2017

(65) Prior Publication Data

US 2019/0031000 A1    Jan. 31, 2019

(51) Int. Cl.
| | |
|---|---|
| *B60J 5/04* | (2006.01) |
| *E05D 15/48* | (2006.01) |
| *E05B 85/10* | (2014.01) |
| *B60J 5/06* | (2006.01) |

(52) U.S. Cl.
CPC .............. *B60J 5/047* (2013.01); *B60J 5/0412* (2013.01); *B60J 5/0486* (2013.01); *B60J 5/06* (2013.01); *E05B 85/10* (2013.01); *E05D 15/48* (2013.01); *E05D 2015/485* (2013.01); *E05D 2700/00* (2013.01)

(58) Field of Classification Search
CPC ... B60J 5/047; B60J 5/06; B60J 5/0486; B60J 5/0412; E05B 85/10; E05D 15/48; E05D 2015/485; E05D 2700/00
USPC ..................... 296/155, 146.9, 146.12, 146.13
See application file for complete search history.

(56) References Cited

U.S. PATENT DOCUMENTS

| | | | | |
|---|---|---|---|---|
| 4,135,760 A | * | 1/1979 | Grossbach | B60J 5/06 296/155 |
| 5,454,618 A | * | 10/1995 | Sullivan | B60J 5/06 180/286 |
| 5,895,089 A | * | 4/1999 | Singh | B60J 5/06 16/86 B |
| 6,234,565 B1 | * | 5/2001 | Bryant | B60J 5/06 296/155 |
| 6,286,260 B1 | | 9/2001 | Grabowski | |
| 6,328,374 B1 | * | 12/2001 | Patel | B60J 5/06 296/155 |
| 8,567,126 B2 | * | 10/2013 | Hozumi | B60J 5/06 49/143 |

(Continued)

FOREIGN PATENT DOCUMENTS

FR    2966780 A1    5/2012

OTHER PUBLICATIONS

Extended European Search Report, Application No. 18186571.8, dated Nov. 30, 2018.

*Primary Examiner* — Jason S Morrow
*Assistant Examiner* — E Turner Hicks
(74) *Attorney, Agent, or Firm* — MacMillan, Sobanski & Todd, LLC

(57) ABSTRACT

A vehicular door assembly that can be opened by both sliding and pivoting movements includes an outer frame portion and an inner door portion. One of the outer frame portion and the inner door portion is slidably mounted on the vehicle, and the other of the outer frame portion and the inner door portion is pivotally mounted on the vehicle. In a first embodiment, the outer frame portion is slidably mounted on the vehicle, and wherein the inner door portion is pivotally mounted on the outer frame portion. In a second embodiment, the outer frame portion is pivotally mounted on the vehicle, and wherein the inner door portion is slidably mounted on the outer frame portion.

6 Claims, 21 Drawing Sheets

(56) References Cited

U.S. PATENT DOCUMENTS

| | | | |
|---|---|---|---|
| 8,646,208 B2* | 2/2014 | Taracko | B60J 5/06 49/155 |
| 2003/0218358 A1* | 11/2003 | Hahn | B60J 5/047 296/155 |
| 2006/0197357 A1 | 9/2006 | Catania | |
| 2009/0212590 A1 | 8/2009 | Taracko | |
| 2016/0082815 A1 | 3/2016 | Lee et al. | |
| 2016/0272054 A1* | 9/2016 | Maruyama | B60J 5/047 |

* cited by examiner

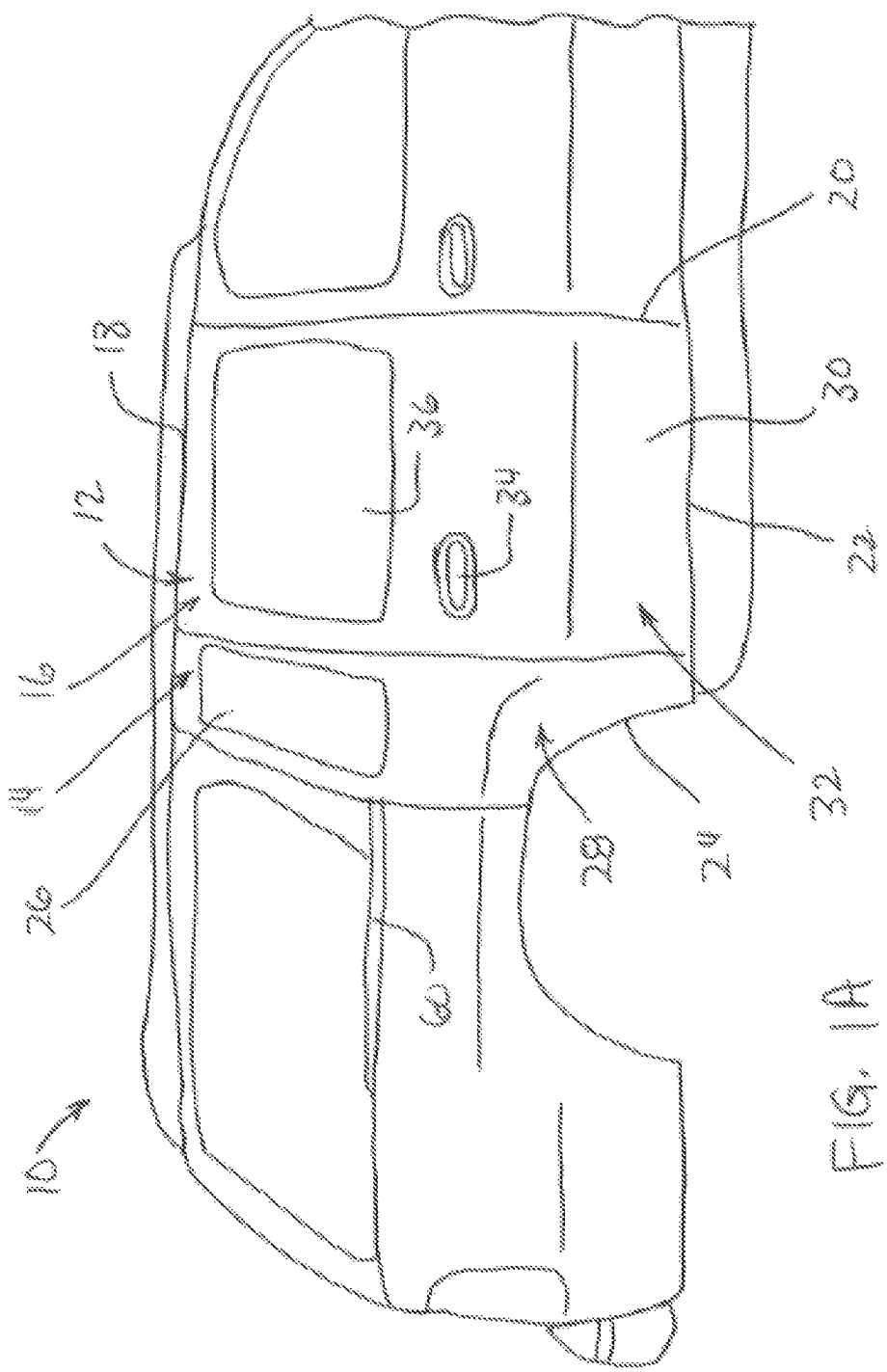

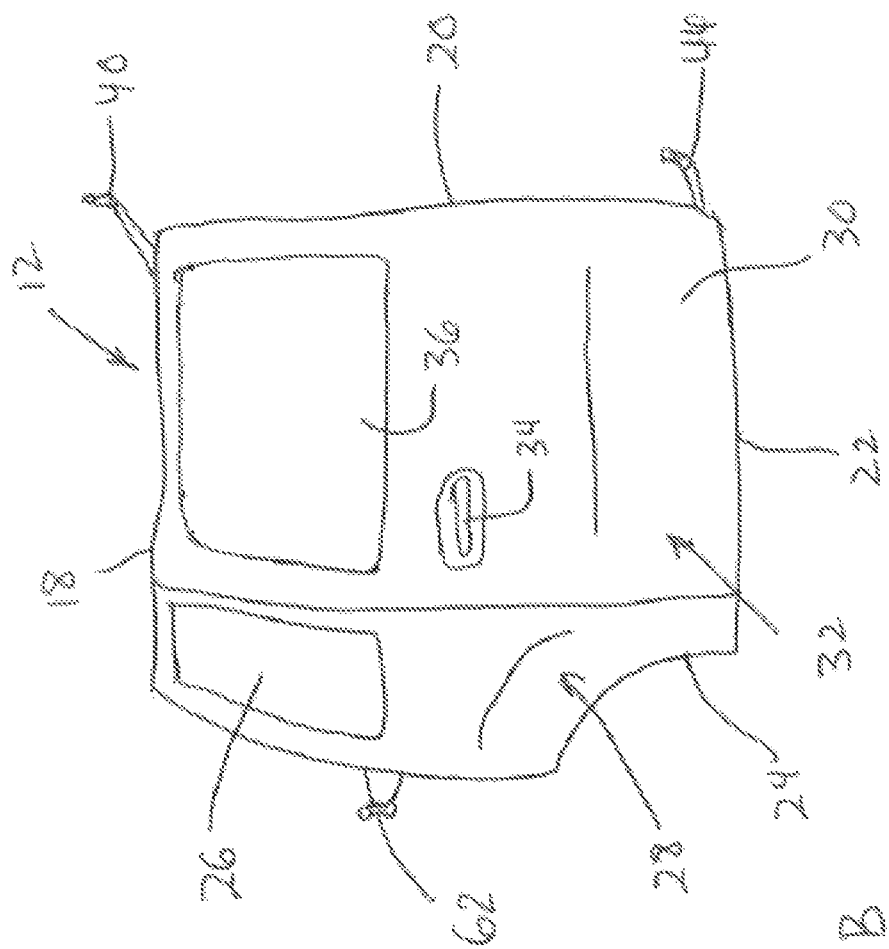

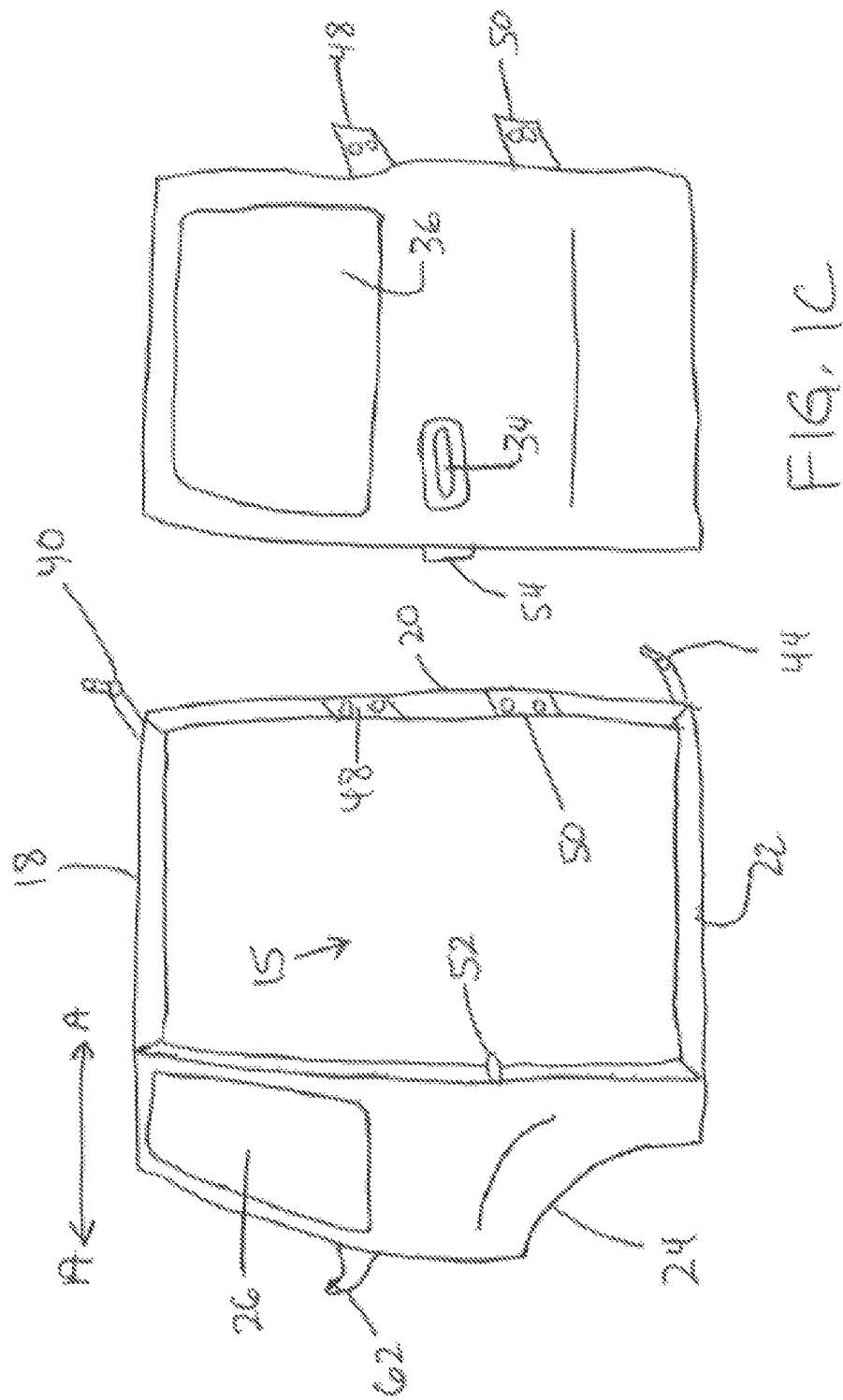

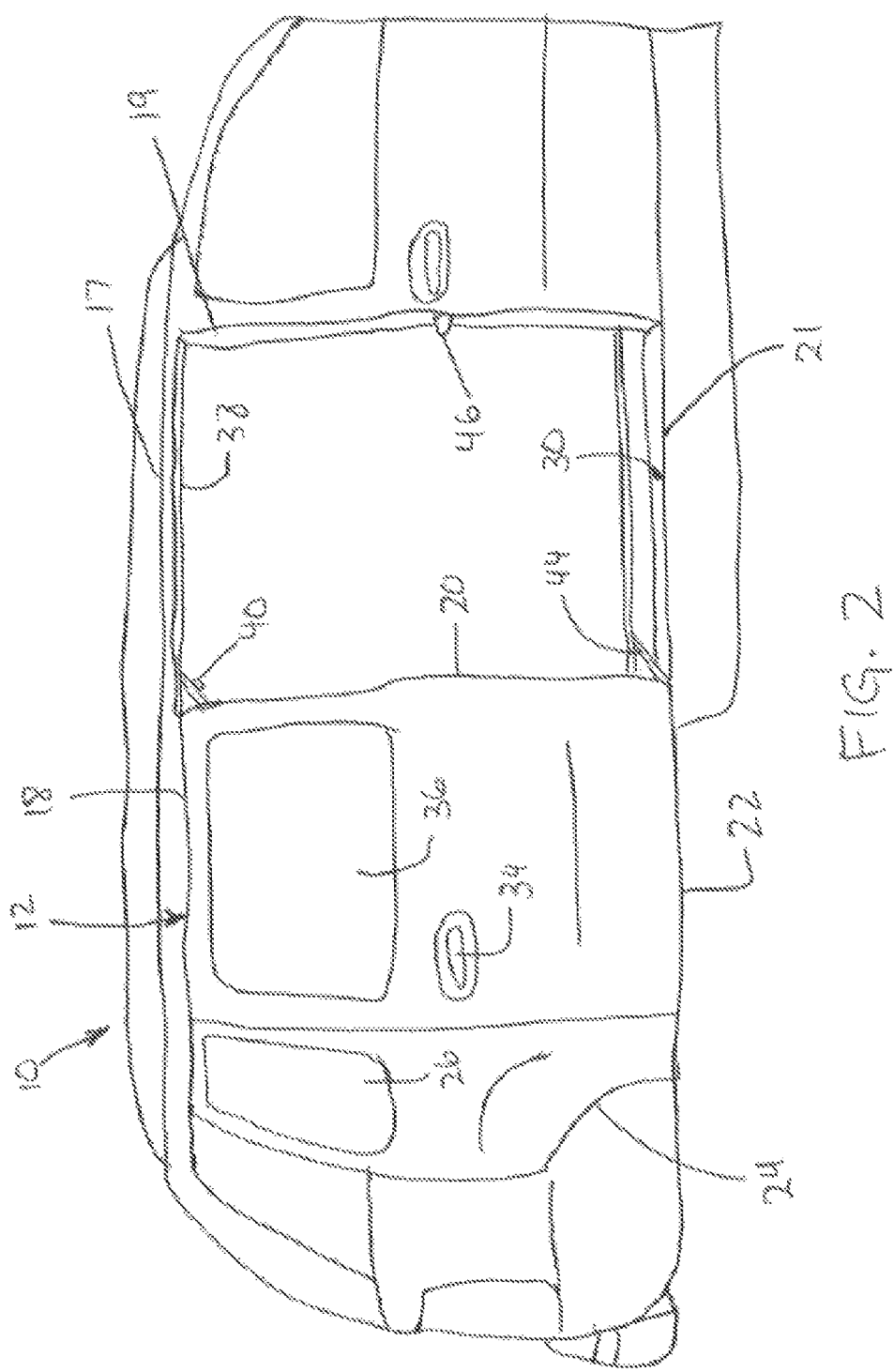

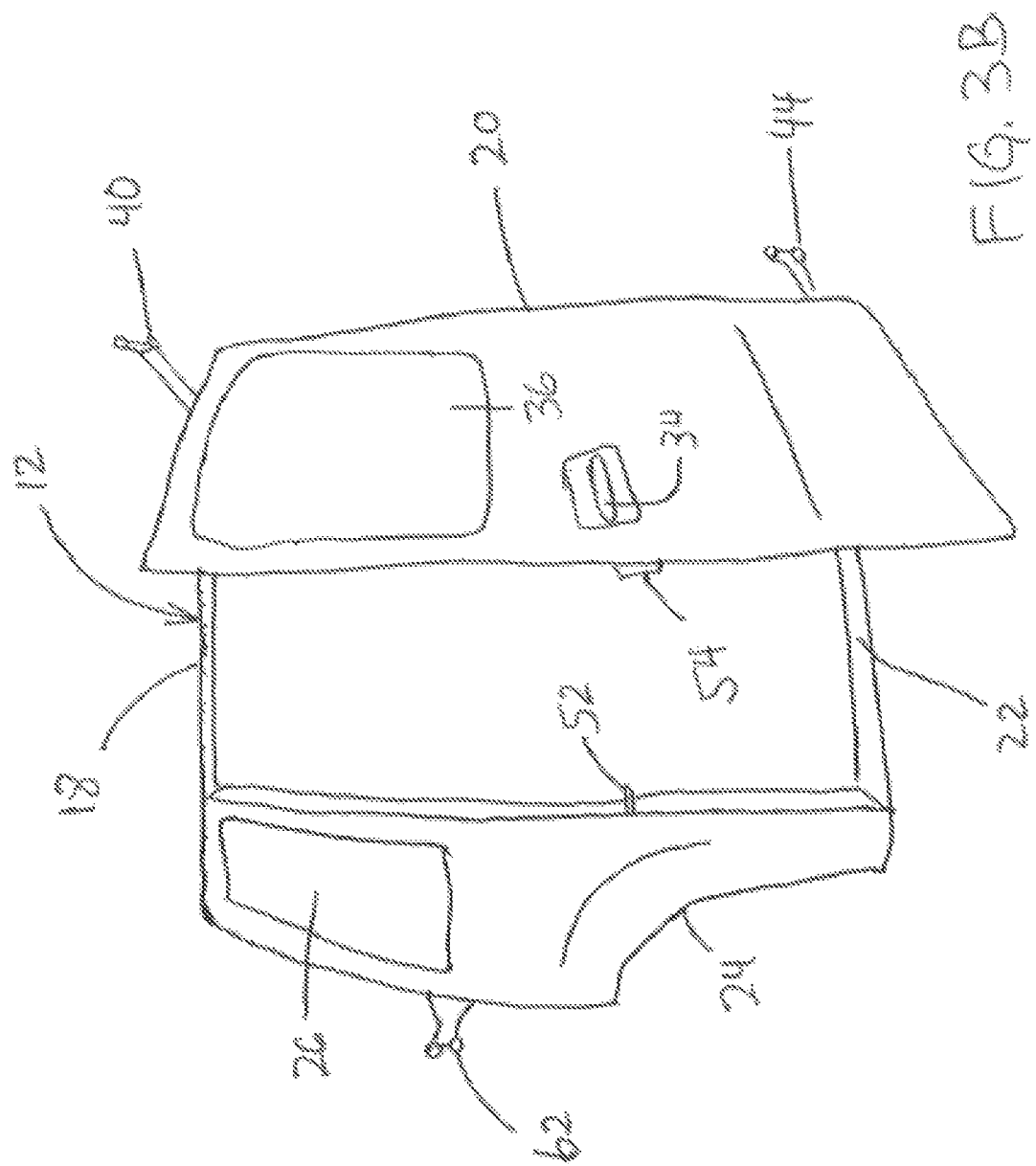

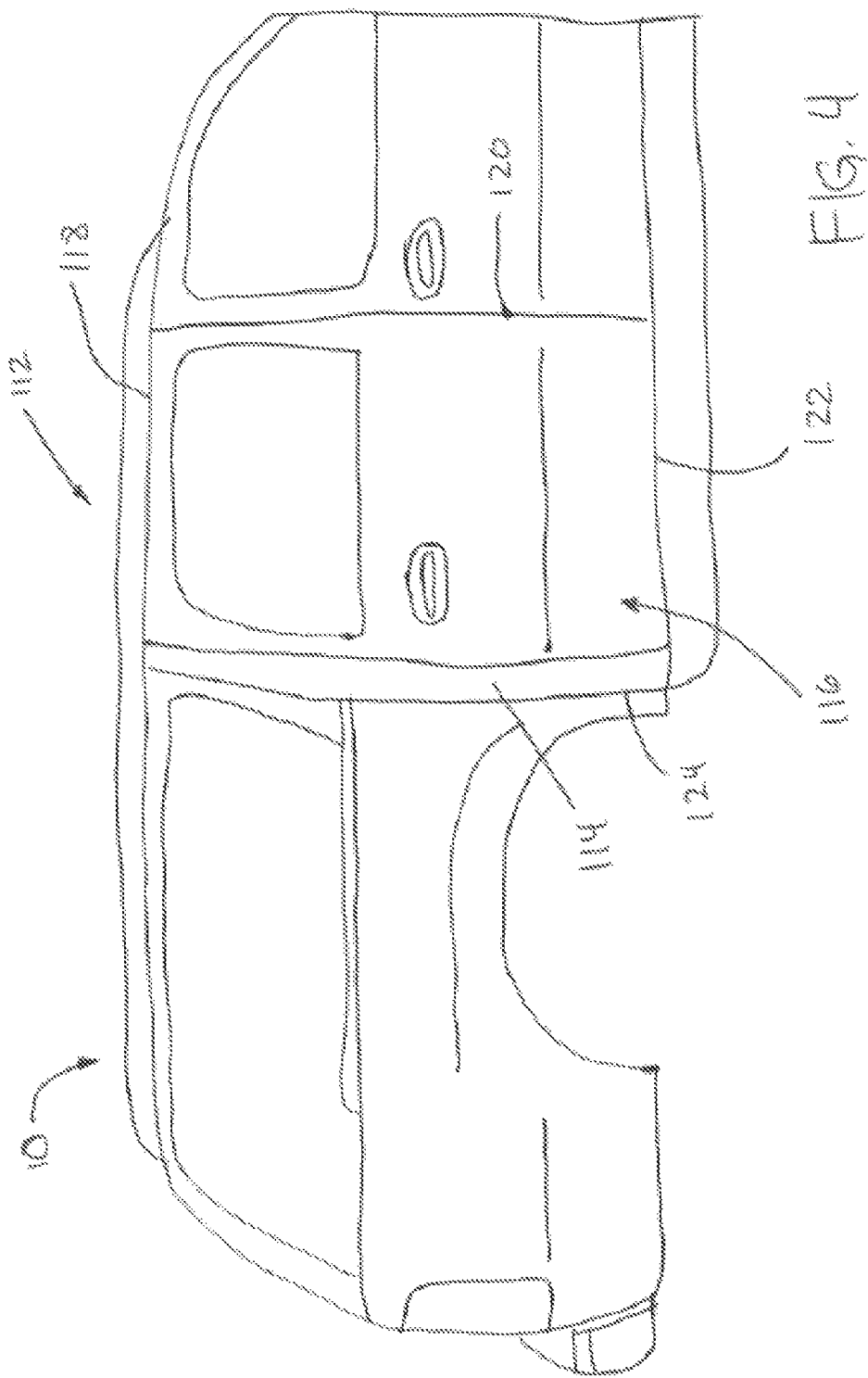

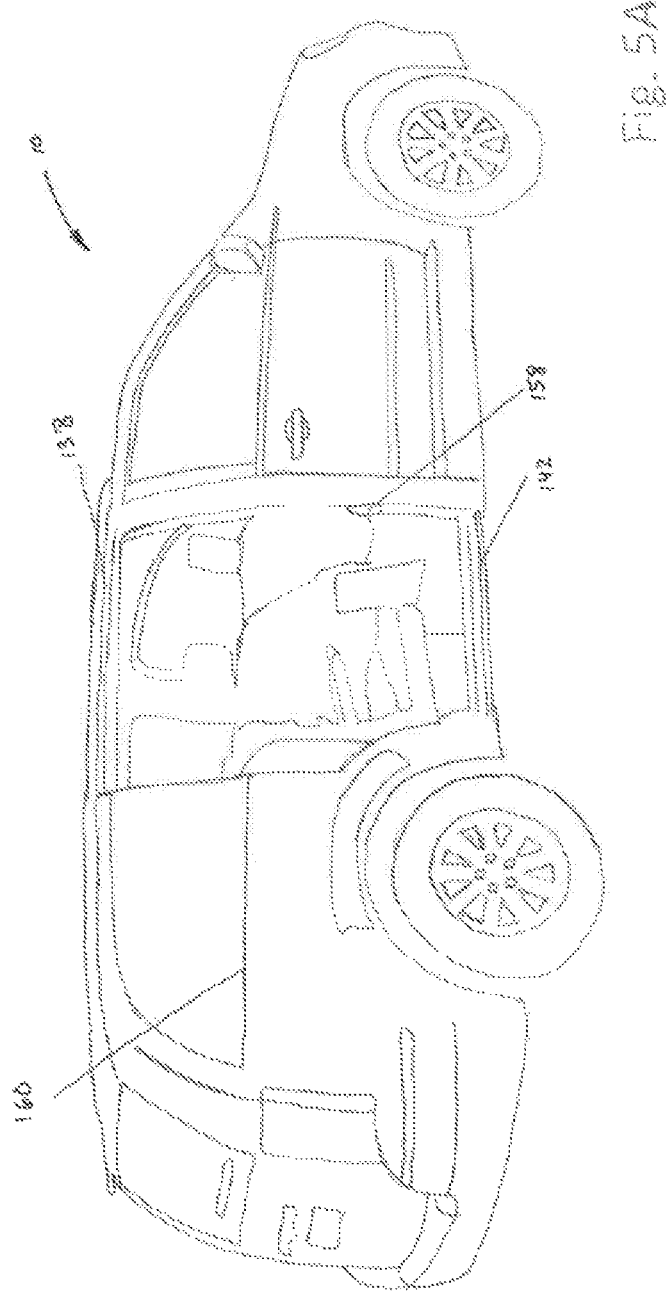

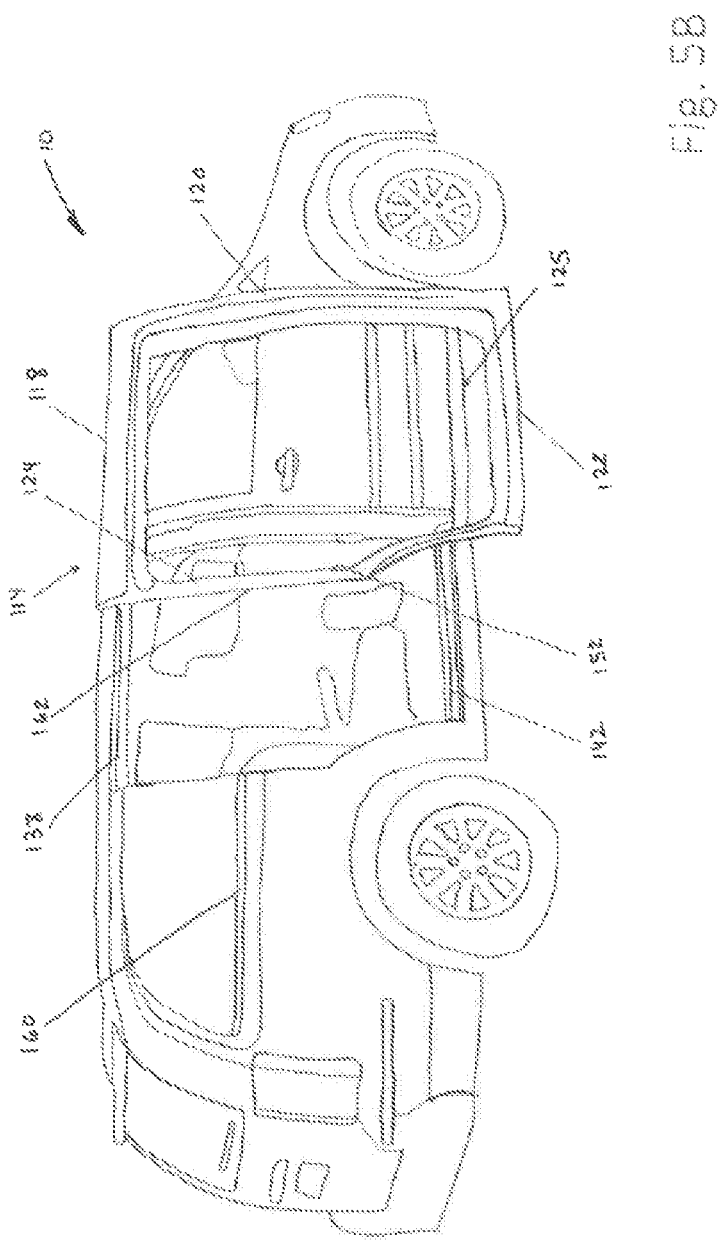

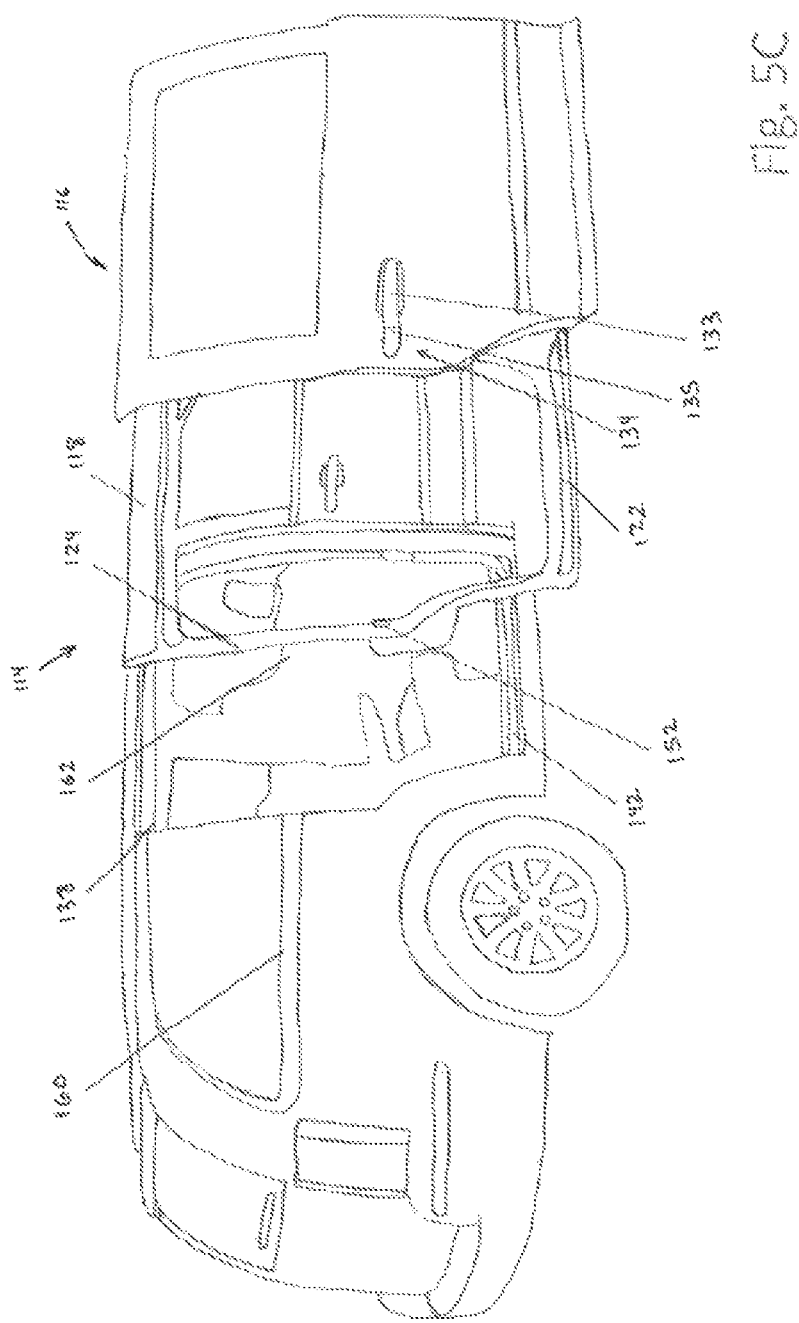

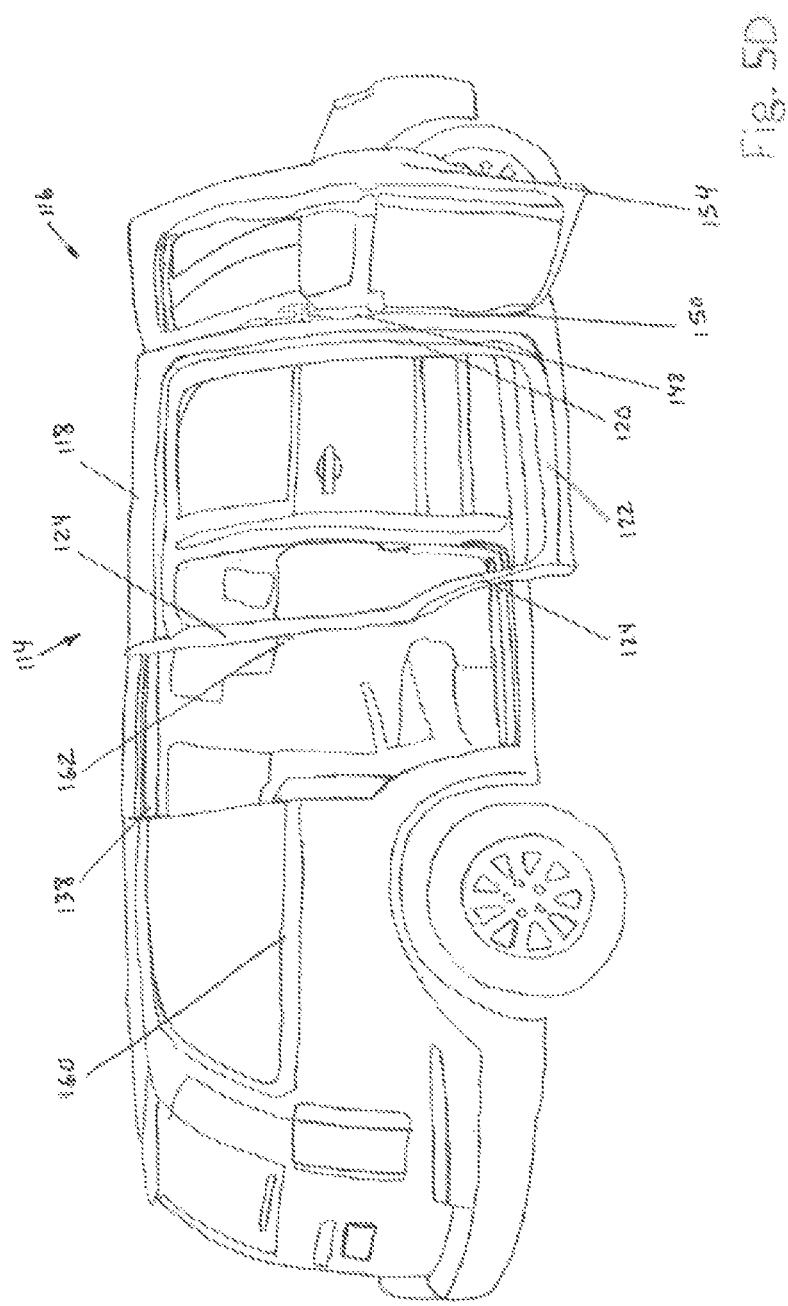

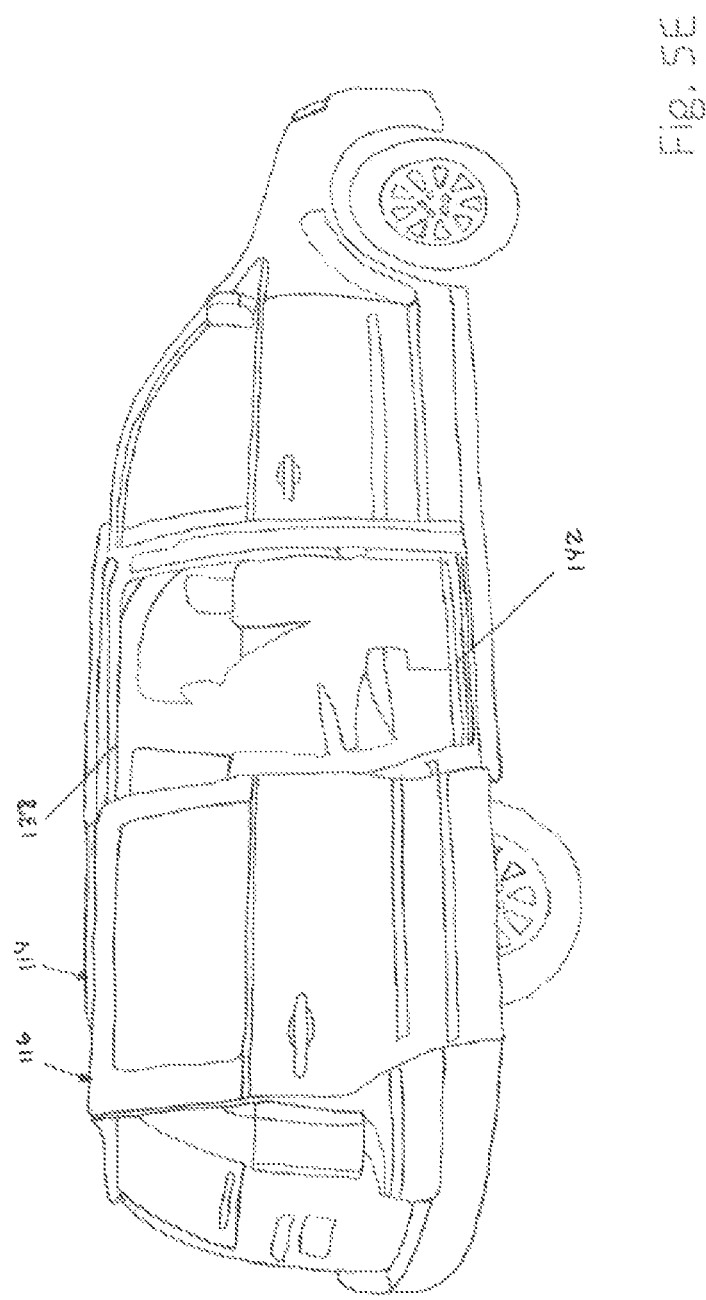

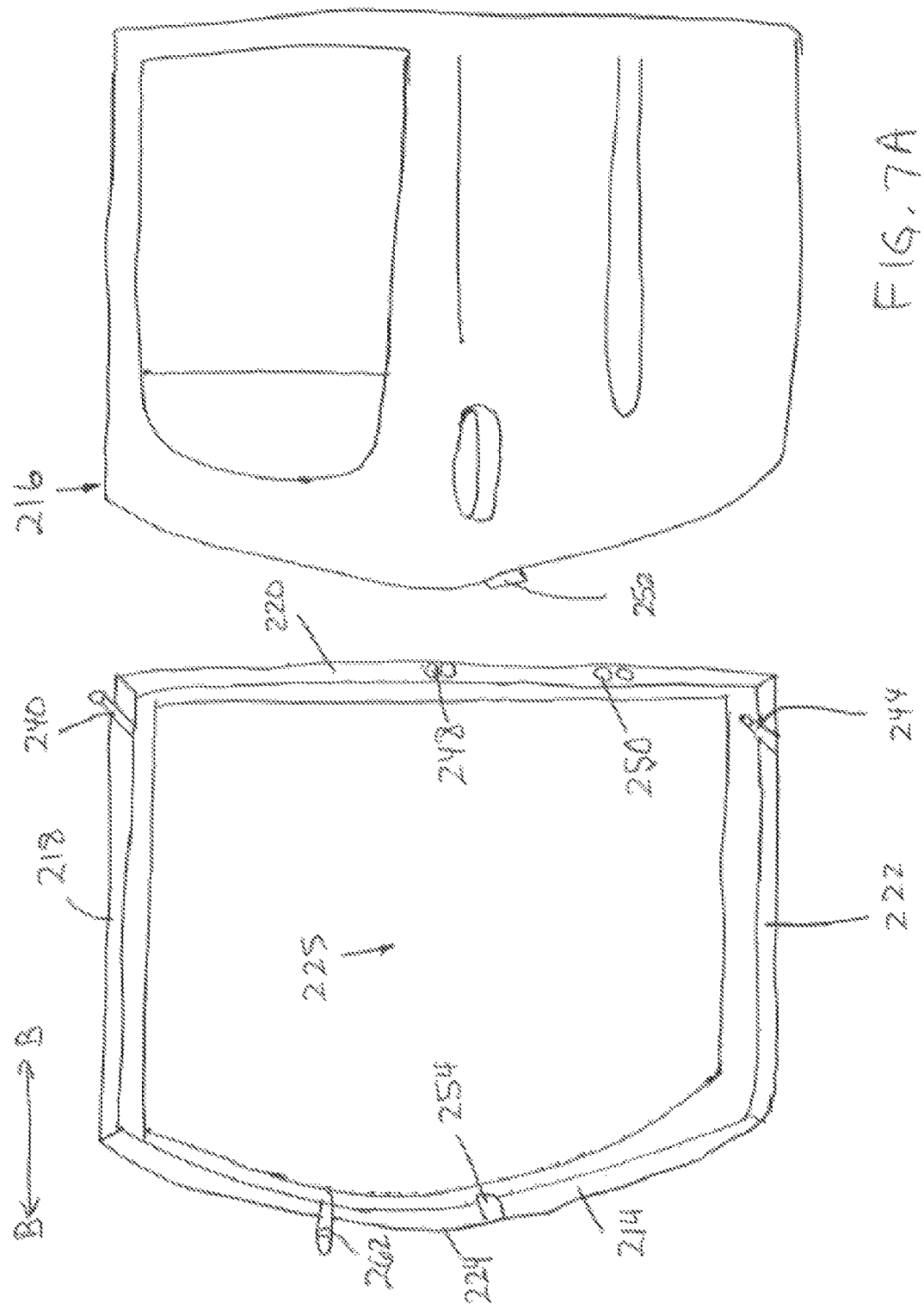

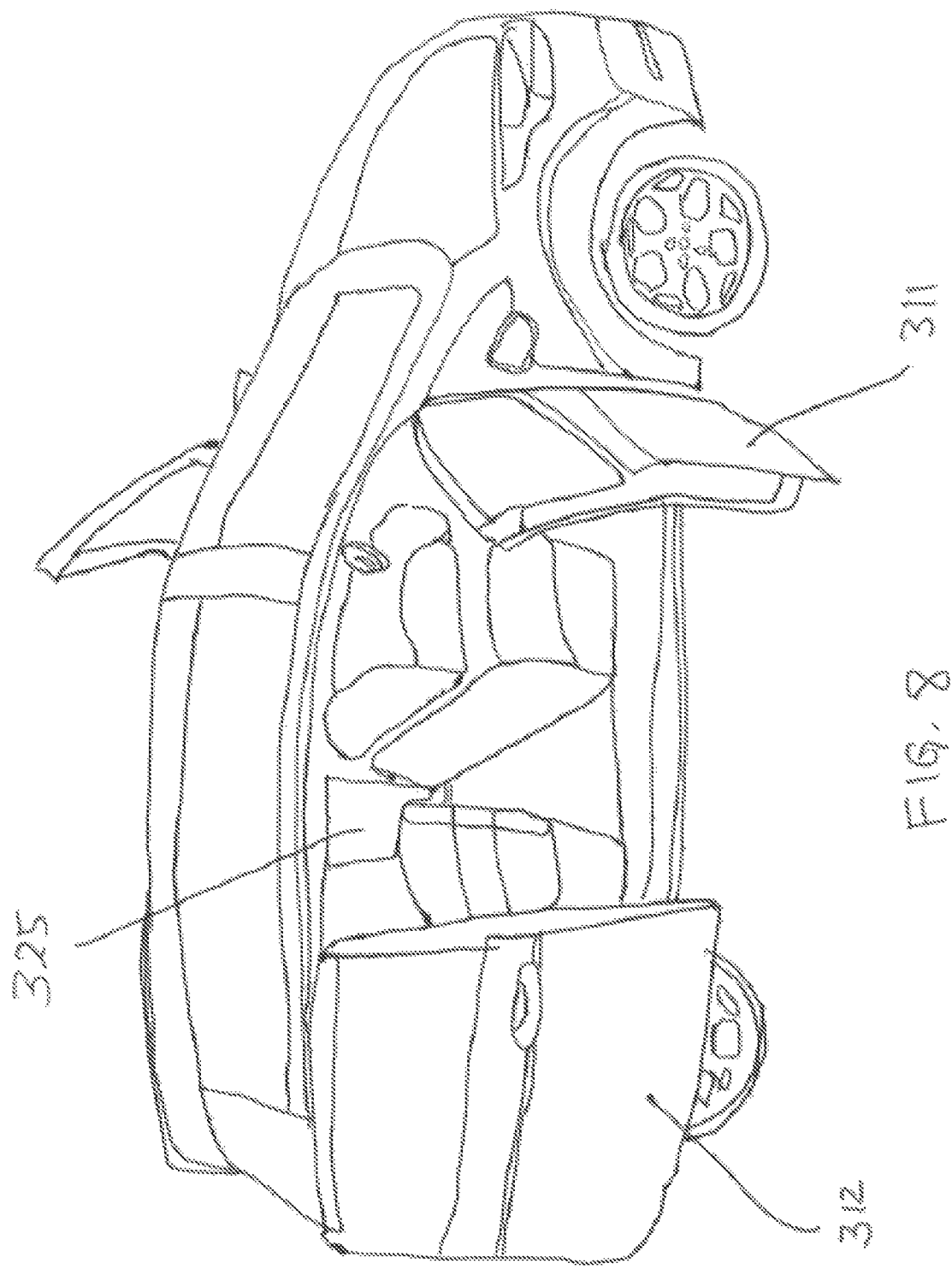

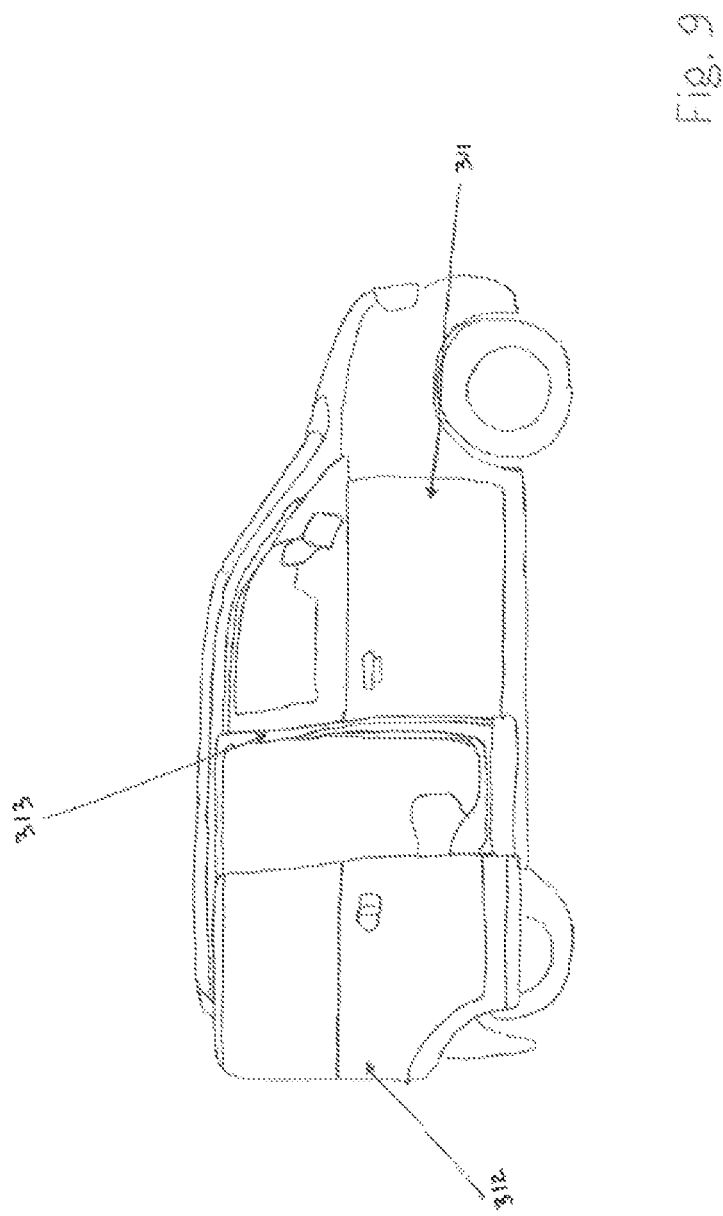

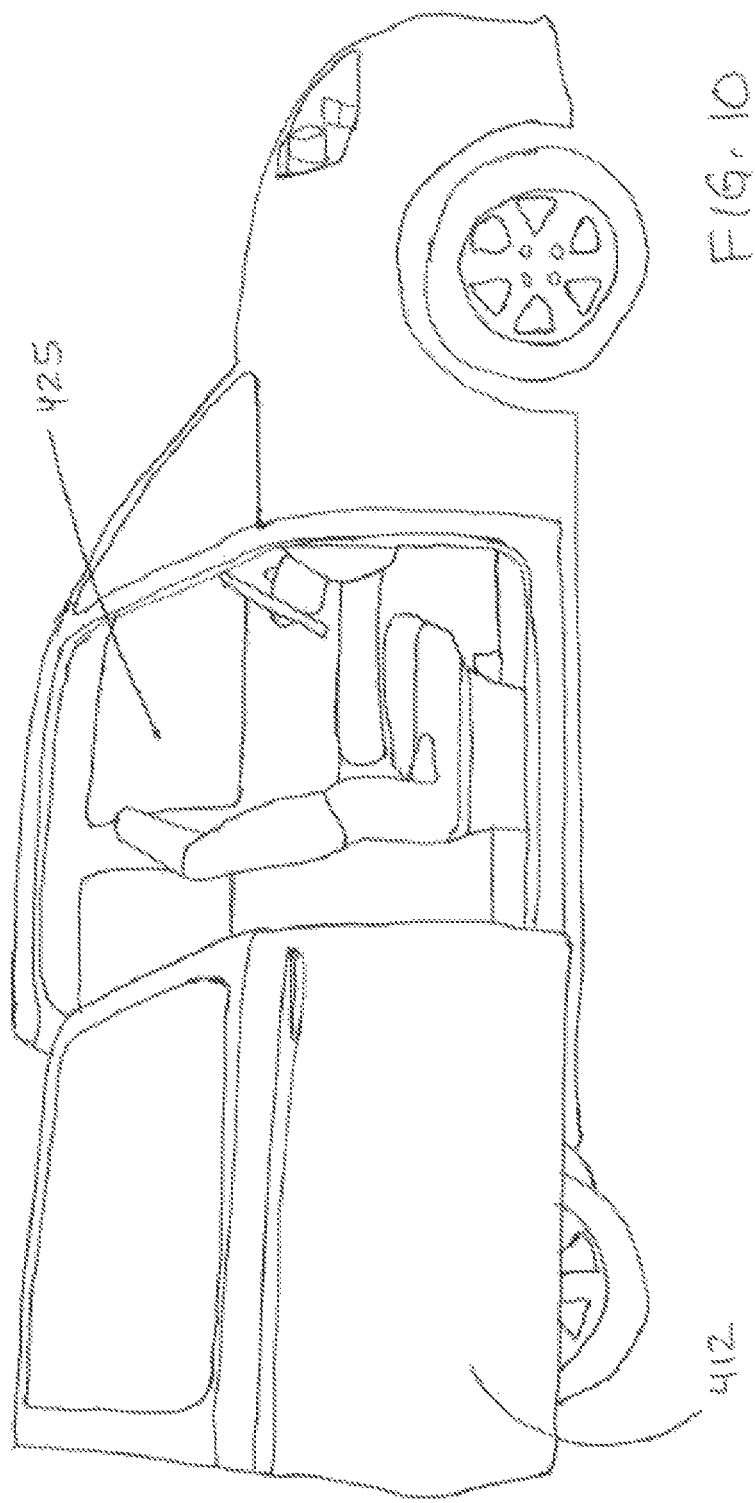

SLIDING AND PIVOTING DOOR COMBINATION ASSEMBLY FOR A VEHICLE

BACKGROUND OF THE INVENTION

This invention relates in general to door assemblies for motor vehicles. In particular, this invention relates to an improved structure for a vehicular door assembly that can be opened by both sliding and pivoting movements so as to create a dual entry system for accessing the vehicle.

Virtually all vehicles are provided with one or more door assemblies that allow persons to get into and out of the interior of the vehicle. Minivans, trucks, commercial, and other vehicles are often provided with door assemblies that can be opened by either a sliding movement or by a pivoting movement of a door relative to a frame or other portion of a vehicle. In a sliding movement type of vehicular door assembly, a door is supported on a track that allows the door to initially move generally perpendicularly away from the vehicle, then slide parallel along the vehicle to expose an opening. In a pivoting movement type of vehicular door assembly, a door is supported on a hinge that allows the door to swing away from the vehicle to expose the opening.

Known sliding and pivoting vehicular door assemblies are mutually exclusive, i.e., a sliding movement type of vehicular door assembly can only be opened by sliding the door relative to the opening, and a pivoting movement type of vehicular door assembly can only be opening by pivoting the door relative to the opening. Although both types of vehicular door assemblies are effective, it would be convenient in some instances to provide a vehicular door assembly that can be opened by either or both sliding and pivoting movements as desired.

SUMMARY OF THE INVENTION

This invention relates to an improved structure for a vehicular door assembly that can be opened by either or both sliding and pivoting movements. Such a slidable and pivotable vehicular door assembly includes an outer frame portion and an inner door portion, one of which is slidably mounted on the vehicle and the other of which is pivotally mounted on the vehicle. For example, if the outer frame portion is slidably mounted on the vehicle, then the inner door portion can be pivotally mounted on the outer frame portion. Alternatively, if the outer frame portion is pivotally mounted on the vehicle, then the inner door portion can be slidably mounted on the outer frame portion. In either event, the outer frame portion and the inner door portion can be operated independently to provide a dual entry system for a vehicular door assembly that can be opened by both sliding and pivoting movements. Preferably, the outer frame portion may be configured to fit the sliding door assembly location of a traditional vehicle without further modifications to the vehicle structure.

Various objects and advantages of this invention will become apparent to those skilled in the art from the following detailed description of the preferred embodiments, when read in light of the accompanying drawings.

BRIEF DESCRIPTION OF THE DRAWINGS

FIG. 1A is a side elevational view of a portion of a vehicle including a first embodiment of a door assembly that can be opened by both sliding and pivoting movements in accordance with this invention, wherein an outer frame portion and an inner door portion of the vehicular door assembly are shown in closed positions.

FIG. 1B is a side elevational view of the door assembly illustrated in FIG. 1A.

FIG. 1C is an exploded side elevational view of the sliding outer frame portion and the hinged inner door portion illustrated in FIG. 1.

FIG. 2 is a side elevational view similar to FIG. 1 showing the first embodiment of the vehicular door assembly in a first opened position.

FIG. 3B is a side elevational view of the sliding door frame shell and the hinging door illustrated in FIG. 3A, shown separated from the vehicle body.

FIG. 4 is a side elevational view of a portion of a vehicle including a second embodiment of a door assembly that can be opened by both sliding and pivoting movements in accordance with this invention, wherein an outer frame portion and an inner door portion of the vehicular door assembly are shown in closed positions.

FIG. 5A is a perspective view of the second embodiment of the vehicle body with upper and lower tracks.

FIG. 5B is an exploded perspective view of the second embodiment of the vehicle body and outer frame portion.

FIG. 5C is another exploded perspective view of the second embodiment of the vehicle body, outer frame portion, and inner door portion.

FIG. 5D is a partially exploded perspective view of the second embodiment of the vehicle body with the outer frame portion and the inner door portion pivotally mounted together and the inner door portion in the second opened position.

FIG. 5E is a perspective view of the vehicle including the second embodiment of the door assembly with the outer frame portion in an open position and the inner door portion in the first opened position.

FIG. 7A is a side elevational view of the sliding door frame shell and the hinging door separated from one another.

FIG. 8 is a perspective view of an embodiment of the invention without a post separating front and rear doors.

FIG. 9 is a perspective view of an embodiment of the invention with a post separating the front and rear doors.

FIG. 10 is a perspective view of an embodiment of a vehicle provided with a single dual entry system.

DETAILED DESCRIPTION OF THE PREFERRED EMBODIMENTS

Figure 3A:
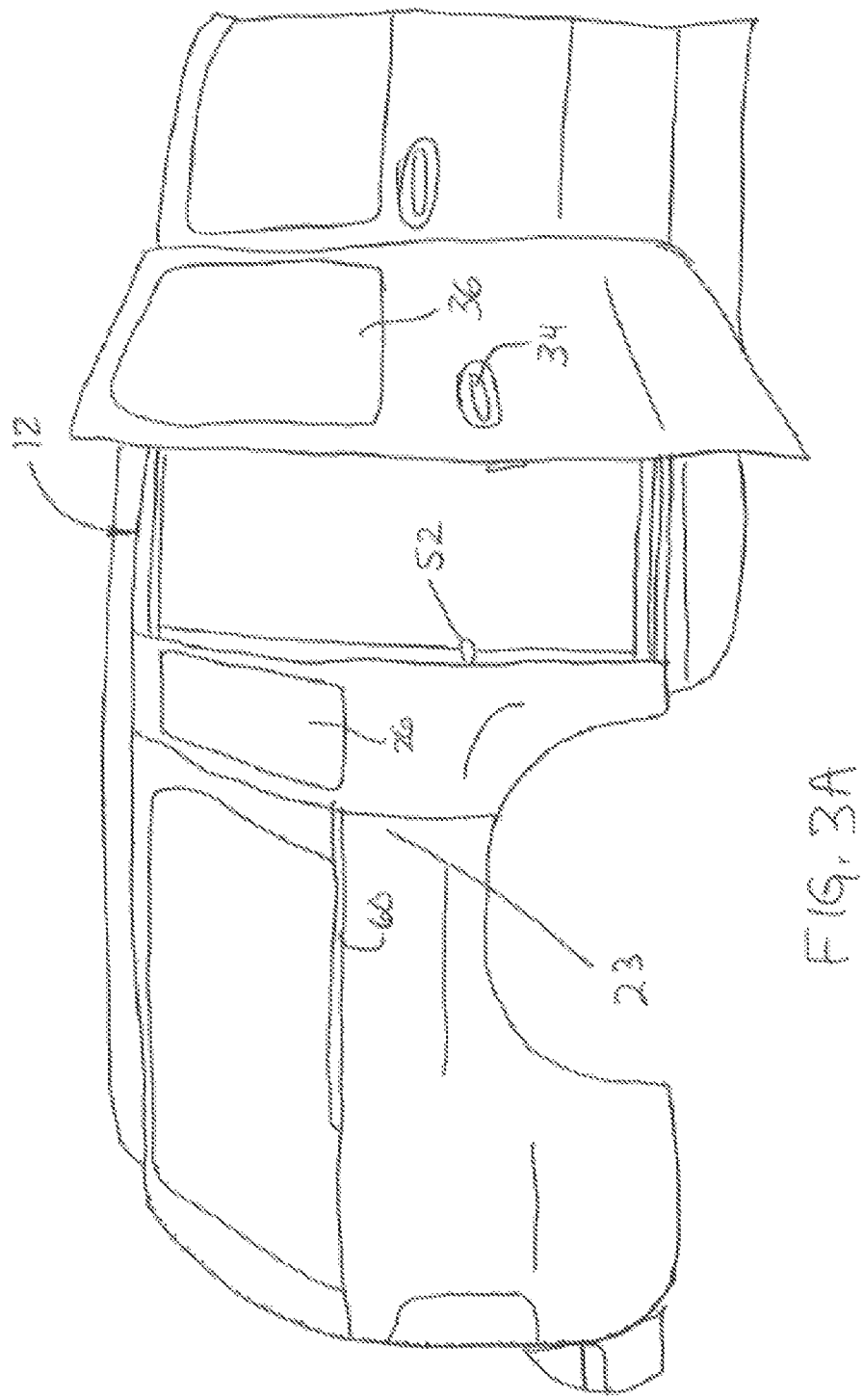
FIG. 3A is a side elevational view similar to FIG. 1 showing the first embodiment of the vehicular door assembly in a second opened position.

In the following description of the invention, certain terminology will be used for the purpose of reference only, and are not intended to be limiting. Terms such as "upper," "lower," "above," "below," "rightward," "leftward," "clockwise," and "counterclockwise" refer to directions in the drawings to which reference is made. Terms such as "inward" and "outward" refer to directions toward and away from, respectively, the geometric center of the component described. Terms such as "front," "rear," "side," "left," "right," "top," "bottom," "horizontal," and "vertical" describe the orientation of portions of the component within a consistent but arbitrary frame of reference that is made clear by reference to the text and the associated drawings describing the component under discussion. Such terminology will include the words specifically mentioned above, derivatives thereof, and words of similar import.

Referring now to the drawings, there is illustrated in FIG. 1A, FIG. 1B, and FIG. 1C, a portion of a vehicle, such as a minivan, indicated generally at 10. The vehicle 10 includes a first embodiment of a vehicular door assembly, indicated generally at 12, that can be opened by both sliding and pivoting movements. The vehicular dual entry system door assembly 12 includes an outer frame portion 14 and an inner door portion 16, both of which are shown in the closed position in FIG. 1A. The illustrated outer frame portion 14 includes a top frame member 18, a forward frame member 20, a bottom frame member 22, and a rearward frame member 24, that together define an opening 25. It should be understood, however, that the outer frame portion 14 may have any suitable number of frame members in any suitable configuration or orientation. The illustrated outer frame portion 14 is secured to the vehicle 10 via one or more of the top frame member 18, the forward frame member 20, the bottom frame member 22, and/or the rearward frame member 24 by removable or permanent securing elements known in the art. For example, the frame members of the outer frame portion could be secured to one or more of respective a vehicle top frame member 17, a vehicle forward frame member 19, a vehicle bottom frame member 21, and/or a vehicle rearward frame member 23.

In this first embodiment of the invention, the rearward frame member 24 is enlarged to provide an extended version of the vehicle 10. The illustrated rearward frame member 24 preferably includes an outer frame window 26, although such is not required. The outer frame portion 14 may be contoured, as generally indicated at 28, to conform to the body of the vehicle 10. The inner door portion 16 includes an outer panel 30 that is also preferably contoured to conform to the body of the vehicle 10, as generally indicated at 32. The inner door portion 16 also includes an outer dual action handle 34, the purpose of which will be discussed below. As shown, the inner door portion 16 may include a window 36, although such is not required.

An optional feature of invention is the rear frame member 24 can be adjusted along the lengths of the bottom frame member 22 and the top frame member 18, in the direction shown by line A-A FIG. 1C, to reduce and/or increase the respective distance between the rear frame member 24 and the forward frame member 20. The aforementioned adjustment feature allows a longer or shorter vehicular door assembly 12 length, and respectively a larger or smaller opening 25. The adjustment allows the vehicular door assembly 12 or be adjusted to a variety of different sized vehicles and/or accept a variety of different sized inner door portions 16 without modification to the vehicle 10 structure.

As best shown in FIG. 2, the vehicle 10 has an upper track 38 provided thereon. The outer frame portion 14 of the vehicular door assembly 12 is slidably supported on the upper track 38 by an upper track arm 40 that is connected to the top frame member 18. Similarly, the vehicle 10 has a lower track 42 provided thereon. The outer frame portion 14 of the vehicular door assembly 12 is slidably supported on the lower track 42 by a lower track arm 44 that is connected to the bottom frame member 22. A center track 60 may also be provided on the vehicle 10 to slidably support a center track arm 62 that is connected to the rear frame member 24.

The vehicle 10 further includes at least one frame striker 46 for engagement by one or more frame latch assemblies, not shown, that are provided on the outer frame portion 14 of the vehicular door assembly 12. The frame striker 46 and the frame latch assembly are conventional in the art and cooperate to selectively secure the outer frame portion 14 to the vehicle 10 when closed. Preferably, the operation of the frame latch assembly is controlled through movement of the outer dual action handle 34 in a known manner or in the manner later described. Preferably, the outer dual action handle 34 is also suitable to transfer lateral motion to the outer frame portion 14 relative to the vehicle 10, such to allow opening and closing of the outer frame portion 14.

As best shown in FIGS. 3A and 3B, the inner door portion 16 of the vehicular door assembly 12, is pivotally supported on the outer frame portion 14 at the forward frame member 20 by an upper hinge 48 and a lower hinge 50. The outer frame portion 14 preferably includes a door striker 52 for engagement by a door latch assembly 54 provided in the inner door portion 16 for selectively securing the inner door portion 16 to the outer frame portion 14 when closed in a known manner. Preferably, the door latch assembly is also controlled through the outer dual action handle 34. In addition, the outer dual action handle 34 is preferably suitable to transfer angular motion to the inner door portion 16 relative to the outer frame portion 14, such to allow opening and closing of the inner door portion 16. Preferably, the inner door portion 16 also includes an inner dual action handle (not shown), which serves to function similarly to the outer dual action handle 34.

Figure 5F:
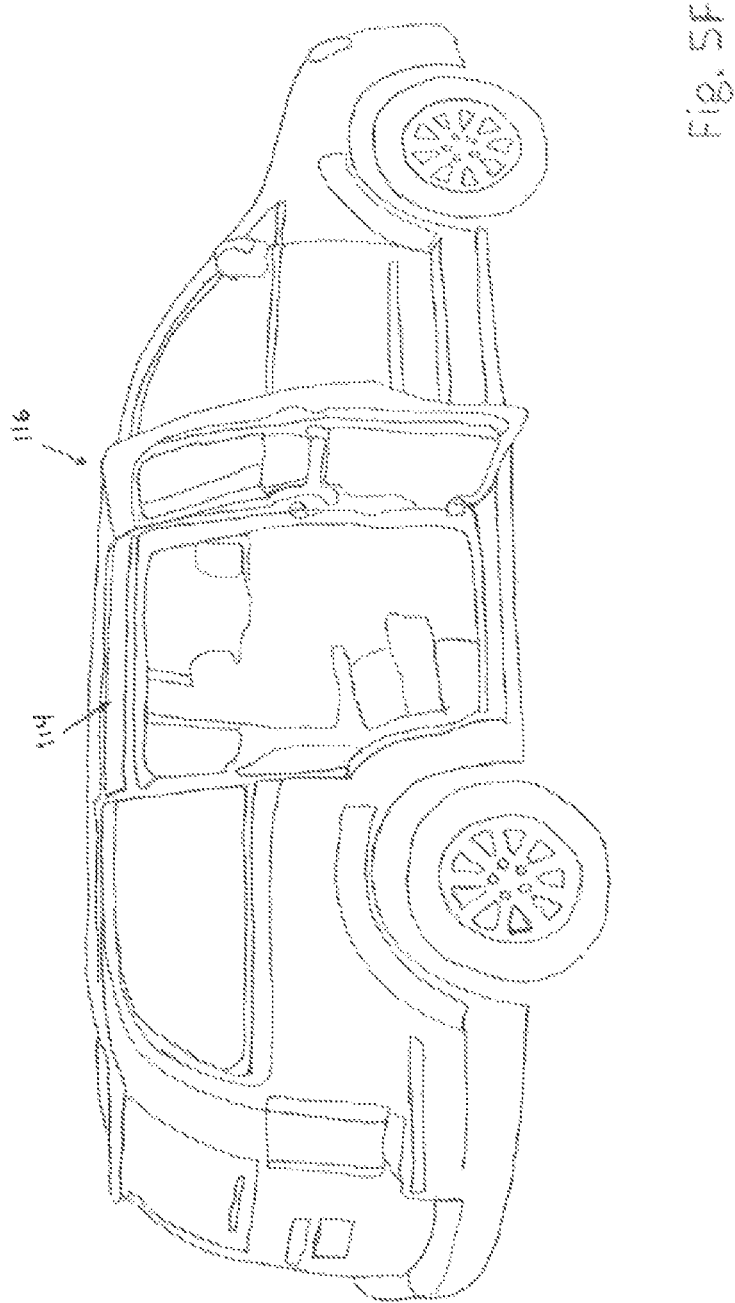
FIG. 5F is a perspective view of the vehicle including the second embodiment of the door assembly with the outer frame portion in a closed position and the inner door portion in the second opened position.

FIG. 4 and FIGS. 5A-5F illustrate a second embodiment of a vehicular door assembly, indicated generally at 112, that can be provided on the vehicle 10 and opened by both sliding and pivoting movements in accordance with this invention. The second embodiment of the vehicular door assembly 112 is generally similar to the first embodiment described above and includes an outer frame portion 114 and an inner door portion 116, both of which are shown in the closed position in FIG. 4. The illustrated outer frame portion 114 includes a top frame member 118, a forward frame member 120, a bottom frame member 122, and a rearward frame member 124 that together define an opening 125. It should be understood, however, that the outer frame portion 114 may have any suitable number of frame members in any suitable configuration or orientation. In this second embodiment of the invention, the rearward frame member 124 is not enlarged similar to the above-described rearward frame member 24 of the first embodiment, but rather is sized approximately the same as the top frame member 118, the forward frame member 120, the bottom frame member 122. As shown in FIG. 5D, the inner door portion 116 of the vehicular door assembly 112 is pivotally supported on the outer frame portion 114 at the forward frame member 120 by an upper hinge 148 and a lower hinge 150. The outer frame portion 114 preferably includes a door striker 152 for engagement by a door latch assembly 154 provided in the inner door portion 116 for selectively securing the inner door portion 116 to the outer frame portion 114 when closed in a known manner.

Preferably, the door latch assembly 112 is also controlled through the outer dual action handle 134. In addition, the outer dual action handle 134 is preferably suitable to transfer angular motion to the inner door portion 116 relative to the outer frame portion 114, such to allow opening and closing of the inner door portion 116. Preferably, the inner door portion 116 also includes an inner dual action handle (not shown), which serves to function similarly to the outer dual action handle 134. Both the outer dual action handle 134 and inner dual action handle allow a user to selectively open the inner door portion 116 and the outer frame portion 114. Preferably, the outer dual action handle 134 and inner dual action handle are each formed as a single unitary user manipulated element, for example a pivoting handle, to control the operation of the inner door portion 116 and the outer frame portion 114. However, it is within the scope if this invention that the outer dual action handle 134 and inner dual action handle are each formed as two or more user manipulated elements, for example a pivoting handle 133 and a button element 135, wherein each user manipulated element controls the respective operation of the inner door portion 116 or the outer frame portion 114.

As best shown in FIG. 5C, the vehicle 10 has an upper track 138 provided thereon. The outer frame portion 114 of the vehicular door assembly 112 is slidably supported on the upper track 138 by an upper track arm that is connected to the top frame member 118. Similarly, the vehicle 10 has a lower track 142 provided thereon. The outer frame portion 14 of the vehicular door assembly 12 is slidably supported on the lower track 142 by a lower track arm that is connected to the bottom frame member 122. A center track 160 may also be provided on the vehicle 10 to slidably support a center track arm 162 that is connected to the rear frame member 124. The structure and operation of the second embodiment of the vehicular door assembly 112 is otherwise the same as the first embodiment door assembly 12 described above.

Referring now to FIGS. 6A, 6B, 7A, and 7B, there is illustrated a third embodiment of a vehicular door assembly, indicated generally at 212, that can be opened by both sliding and pivoting movements. The vehicular door assembly 212 includes an outer frame portion 214 and an inner door portion 216. The illustrated outer frame portion 214 includes a top frame member 218, a forward frame member 220, a bottom frame member 222, and a rearward frame member 224 that together define an opening, indicated generally at 225 in FIG. 5B. It should be understood, however, that the outer frame portion 214 may have any suitable number of frame members in any suitable configuration or orientation. The outer frame portion 214 of the vehicular door assembly 212 is pivotally supported on the minivan 10 by an upper hinge 248 and a lower hinge 250. The outer frame portion 214 preferably includes a door striker 252 for engagement by a door latch assembly 254 provided in the minivan 10 for selectively securing the outer frame portion 214 to the minivan 10 when closed in a known manner. Further included is a frame striker 246 for engagement by a frame latch assembly, not shown, that is provided on the inner door portion 216 of the vehicular door assembly 212. The frame striker 246 and the frame latch assembly are conventional in the art and cooperate to selectively secure the inner door portion 216 to the vehicle 10 when closed.

Figure 6A:
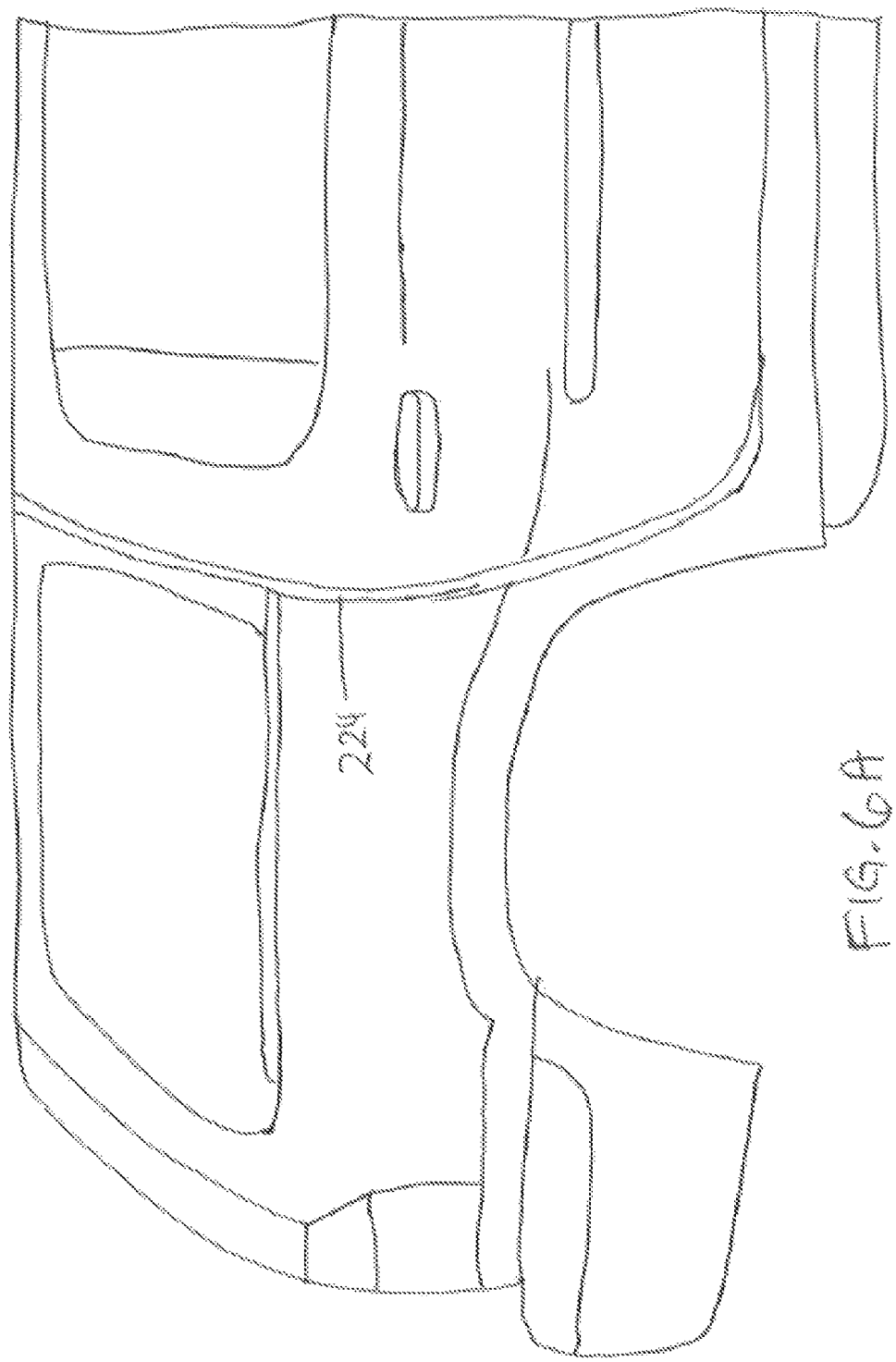
FIG. 6A is a side elevational view of a portion of a vehicle including a third embodiment of a door assembly that can be opened by both sliding and pivoting movements in accordance with this invention, wherein the vehicular door assembly in a first opened position.
Figure 6B:
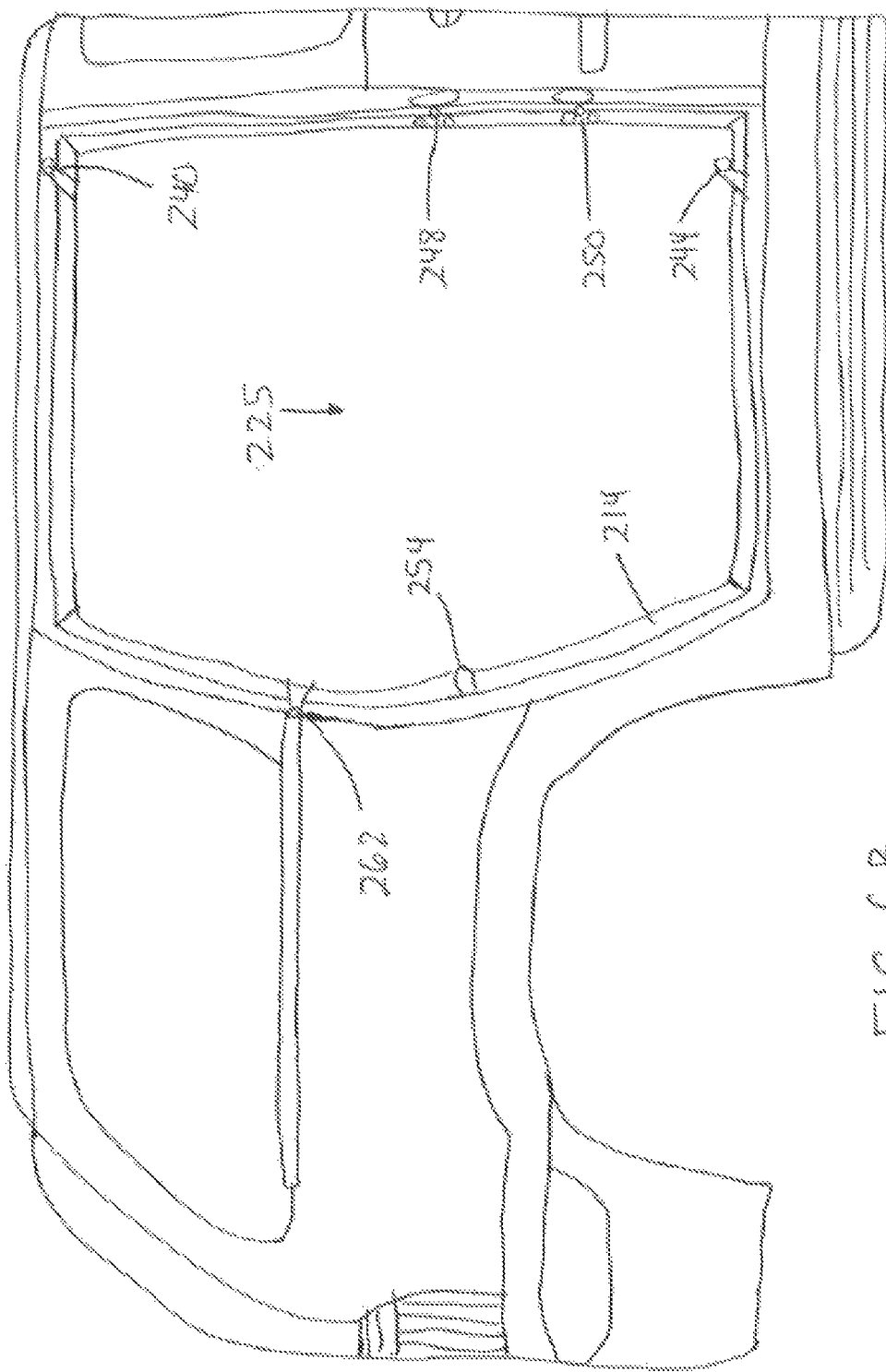
FIG. 6B is a side elevational view of the portion of the vehicle illustrated in FIG. 5A, wherein the hinging door has been removed for clarity.
Figure 7B:
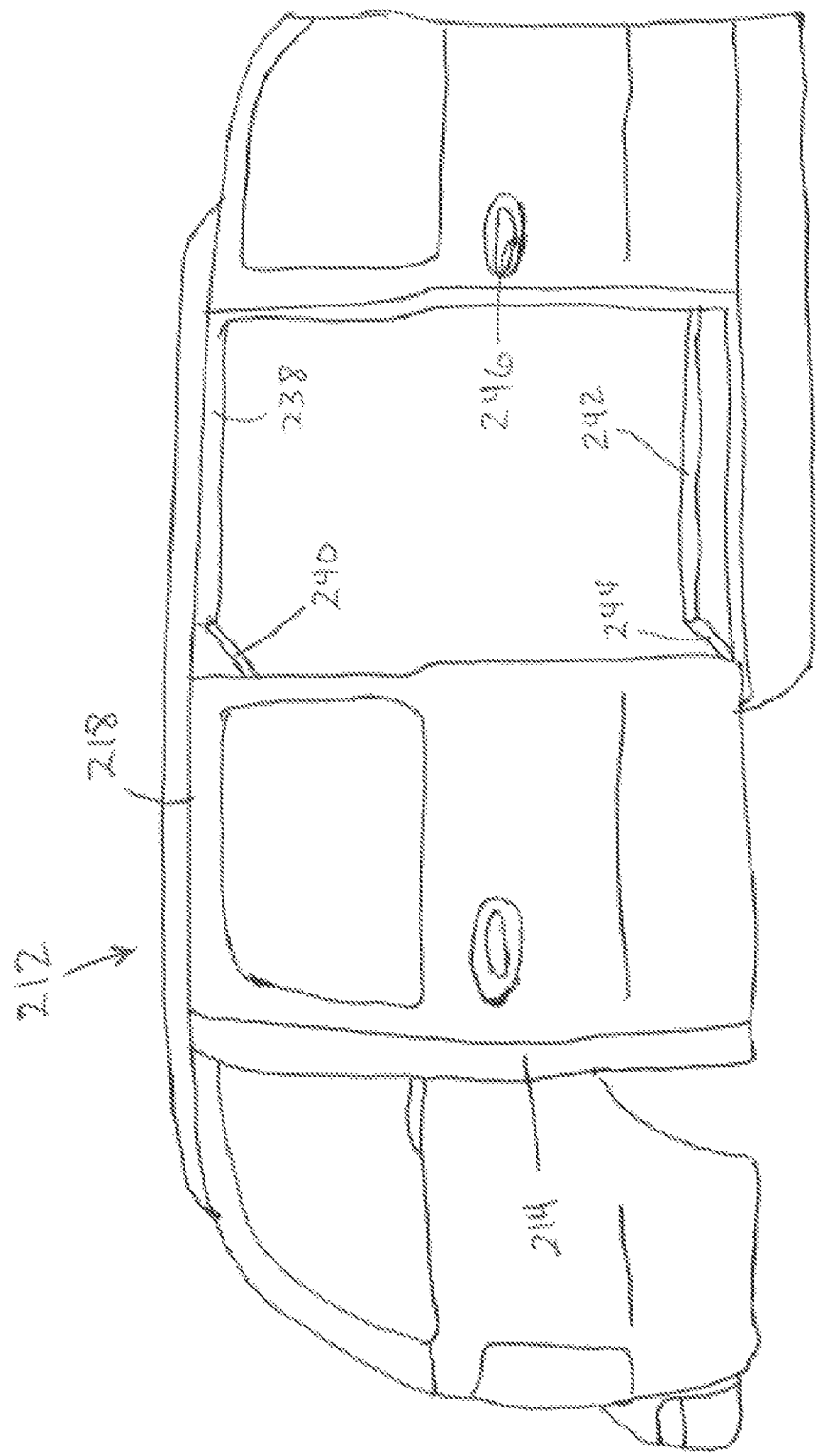
FIG. 7B is a side elevational view showing the third embodiment of the vehicular door assembly in a second opened position.

As best shown in FIG. 6B, the outer frame portion 214 has an upper track 238 provided thereon. The inner door portion 216 of the vehicular door assembly 212 is slidably supported on the upper track 238 by an upper track arm 240 that is connected to the inner door portion 216. Similarly, the outer frame portion 214 has a lower track 242 provided thereon. The inner door portion 216 of the vehicular door assembly 212 is slidably supported on the lower track 242 by a lower track arm 244 that is connected to the inner door portion 216.

An optional feature of invention is the rear frame member 224 can be adjusted along the lengths of the bottom frame member 222 and the top frame member 218, in the direction shown by line B-B FIG. 6A, to reduce and/or increase the respective distance between the rear frame member 224 and the forward frame member 220. The aforementioned adjustment feature allows a longer or shorter vehicular door assembly 212 length, and respectively a larger or smaller opening 225. The adjustment allows the vehicular door assembly 212 or be adjusted to a variety of different sized vehicles and/or accept a variety of different sized inner door portions 216 without modification to the vehicle 10 structure.

As best shown in FIG. 8, the vehicle can be provided with four or more entry doors for respective passenger entryways. One or more of the doors can comprise an inner frame and outer frame to form the dual entry system, as previously described above. In addition, the frame structure of the dual entry system provides structural support such that a post permanently affixed to the vehicle frame is not necessitated between the passenger side front door 311 and a passenger side rear door 312. As such, the passenger side front door 311 and passenger side rear door 312 form a single unitary opening 325 when the inner and outer frames of the dual entry system doors are moved to the open position. Thus, accessibility to the interior of the vehicle is improved. In addition, the driver side front door and driver side rear door can have a similar arrangement between them. It is further within the scope of this invention that one or more of the front or rear doors could be a traditional pivoting door while one or more of the corresponding remaining front or rear doors are dual entry system doors.

Alternatively, the vehicle can be provided a post 313 permanently affixed to the vehicle frame between the passenger side front door 311 and a passenger side rear door 312, as shown in FIG. 9. As such, the passenger side front door 311 and passenger side rear door 312 form two separate passenger opening when the inner and outer frames of the dual entry system doors are moved to the open position. In addition, the driver side front door and driver side rear door can have a similar arrangement between them. It is further within the scope of this invention that one or more of the front or rear doors could be a traditional pivoting door while one or more of the corresponding remaining front or rear doors are dual entry system doors.

As best shown in FIG. 10, it is within the scope of this invention that the vehicle could be provided with a single dual entry system door 412 for accessing the front and rear passenger compartments. For example, the door could be positioned such that the opening 425 spanned between the front and rear passenger areas of ingress and egress. In addition, it is further within the scope of the invention that a single dual entry system door could be provided on either the driver side or passenger side, or on both if desired.

Figure 11:
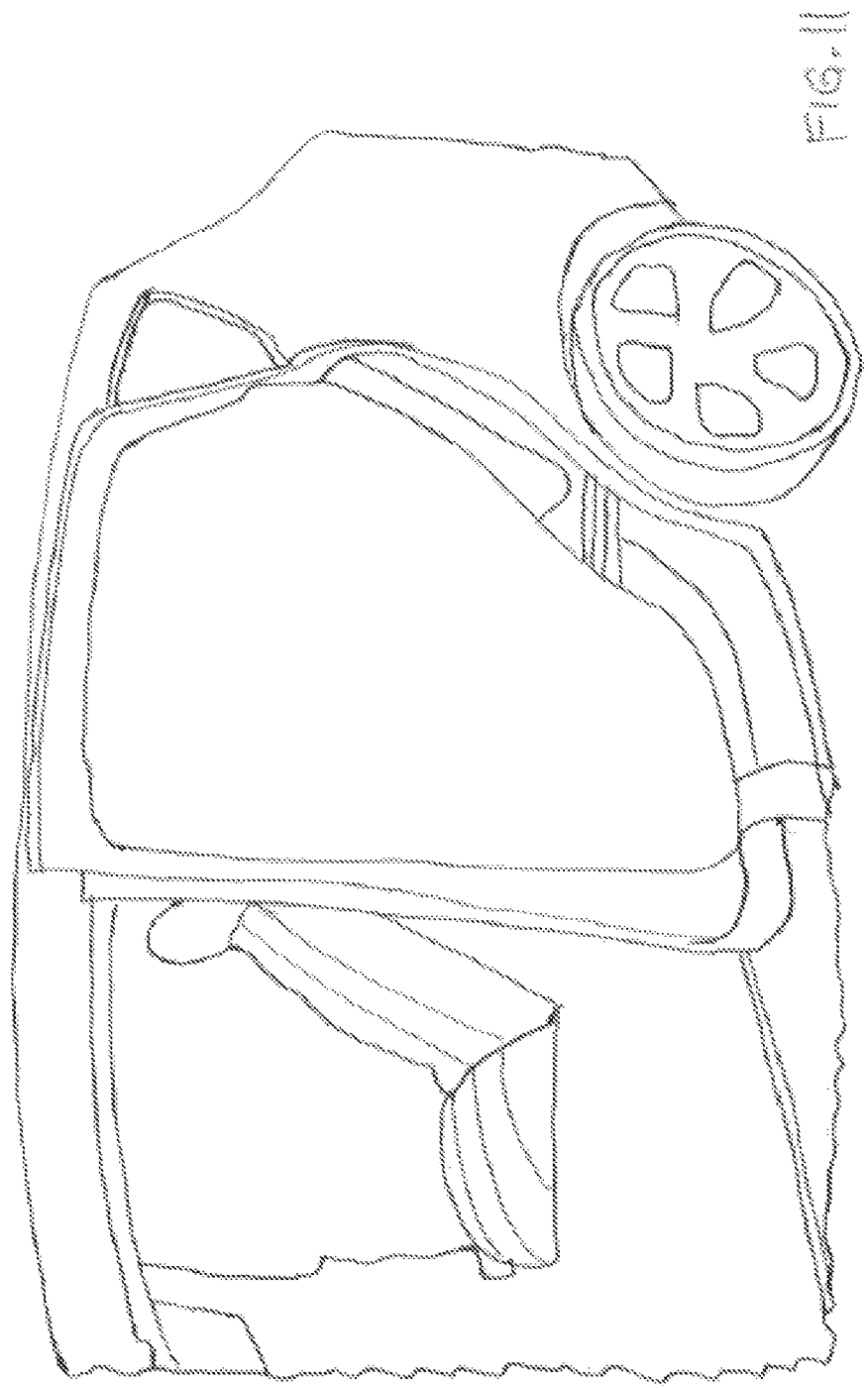
FIG. 11 is a perspective view of an embodiment of a vehicle provided with a strengthened post.

Referring now to FIG. 11, there is illustrated a perspective view of an embodiment of a vehicle provided with a strengthened post. This strengthened post may, for example, be formed from a high strength steel or similar material.

The above embodiments of the invention can optionally include a mechanical and/or electrical mechanism 158 for opening or closing the inner door portion 16 and/or the outer frame portion 14. Such mechanisms can operate to assist a user in opening or closing the inner door portion 16 and/or the outer frame portion 14 in their respective movements. The power supply to support such mechanisms can be routed through electric cords and pin plates to the desired location. In addition, the above embodiments of the invention can optionally include additional devices, for example interlocks, that prevent opening of the inner door portion 16 while the outer frame portion 14 is in a non-closed position or prevent the opening of the outer frame portion 14 when the inner door portion is in a non-closed position. It is further within the scope of the invention that opening of the inner door portion 16 while the outer frame portion 14 is in a non-closed position is permitted and/or that opening of the outer frame portion 14 while the inner door portion is in a non-closed position is permitted. It is also within the scope of the invention that a variety of materials or combination of materials can be used in the dual entry system door or vehicle frame. Such materials could include, but would not be limited to metal, such as high strength steel, or carbon fiber. In addition, the dual entry system doors or their respective frames could also include features such as step boards, guide pins, weather stripping, or locks.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A vehicular door assembly that is adapted to be supported on a vehicle, the vehicular door assembly comprising:
    an outer frame portion including upper and lower track arms that are adapted to support the outer frame portion on a vehicle for sliding movement relative to the vehicle, the outer frame portion including a top frame member, a forward frame member extending downwardly from the top frame member, a bottom frame member extending rearwardly from the forward frame member, and a rearward frame member extending upwardly from the bottom frame member to the top frame member such that the top frame member, the forward frame member, the bottom frame member, and the rearward frame member together define a completely enclosed opening through the outer frame portion; and
    an inner door portion that is supported on the outer frame portion for pivoting movement relative to the outer frame portion between a closed position and an opened position, wherein:
    when the inner door portion is in the closed position, the inner door portion extends between all of the top frame member, the forward frame member, the bottom frame member, and the rearward frame member of the outer frame portion so as to completely cover the completely enclosed opening through the outer frame portion, and
    when the inner door portion is in the opened position, the inner door portion does not extend between all of the top frame member, the forward frame member, the bottom frame member, and the rearward frame member of the outer frame portion to cover the completely enclosed opening through the outer frame portion.

2. The vehicular door assembly defined in claim 1 wherein the outer frame portion further includes a center track arm that is also adapted to support the outer frame portion on vehicle for sliding movement relative to vehicle.

3. The vehicular door assembly defined in claim 2 wherein the upper track arm is connected to the top frame member, the lower track arm is connected to the lower frame member, and the center track arm is connected to the rearward frame member.

4. A combined vehicle and vehicular door assembly comprising:
    a vehicle; and
    a vehicular door assembly supported on the vehicle, the vehicular door assembly comprising:
        an outer frame portion including upper and lower track arms that are adapted to support the outer frame portion on the vehicle for sliding movement relative to the vehicle, the outer frame portion including a top frame member, a forward frame member extending downwardly from the top frame member, a bottom frame member extending rearwardly from the forward frame member, and a rearward frame member extending upwardly from the bottom frame member to the top frame member such that the top frame member, the forward frame member, the bottom frame member, and the rearward frame member together define a completely enclosed opening through the outer frame portion; and
        an inner door portion that is supported on the outer frame portion for pivoting movement relative to the outer frame portion between a closed position and an opened position, wherein
        when the inner door portion is in the closed position, the inner door portion extends between all of the top frame member, the forward frame member, the bottom frame member, and the rearward frame member of the outer frame portion so as to completely cover the completely enclosed opening through the outer frame portion, and
        when the inner door portion is in the opened position, the inner door portion does not extend between all of the top frame member, the forward frame member, the bottom frame member, and the rearward frame member of the outer frame portion to cover the completely enclosed opening through the outer frame portion.

5. The combined vehicle and vehicular door assembly defined in claim 4 wherein the outer frame portion further includes a center track arm that is also adapted to support the outer frame portion on vehicle for sliding movement relative to vehicle.

6. The combined vehicle and vehicular door assembly defined in claim 5 wherein the upper track arm is connected to the top frame member, the lower track arm is connected to the lower frame member, and the center track arm is connected to the rearward frame member.

* * * * *